(No Model.)

J. HAGANS.
CULTIVATOR ATTACHMENT.

No. 304,315. Patented Sept. 2, 1884.

WITNESSES:
Jno L. Bottorff.
E. O. Abbott

INVENTOR:
James Hagans
By H. P. Hood
Atty.

United States Patent Office.

JAMES HAGANS, OF MAXWELL, INDIANA.

CULTIVATOR ATTACHMENT.

SPECIFICATION forming part of Letters Patent No. 304,315, dated September 2, 1884.

Application filed April 7, 1884. (No model.)

*To all whom it may concern:*

Be it known that I, JAMES HAGANS, a citizen of the United States, residing at Maxwell, in the county of Hancock and State of Indiana, have invented a new and useful Improved Cultivator Attachment, of which the following is a specification.

My invention relates to an improved means for attaching the shovels to cultivator-plows.

The object of my improvement is to attach to a single plow-standard, in a cultivator designed to carry a single stirring-shovel, a pair of stirring-shovels, as hereinafter described.

The accompanying drawings illustrate my invention.

Figure 2:
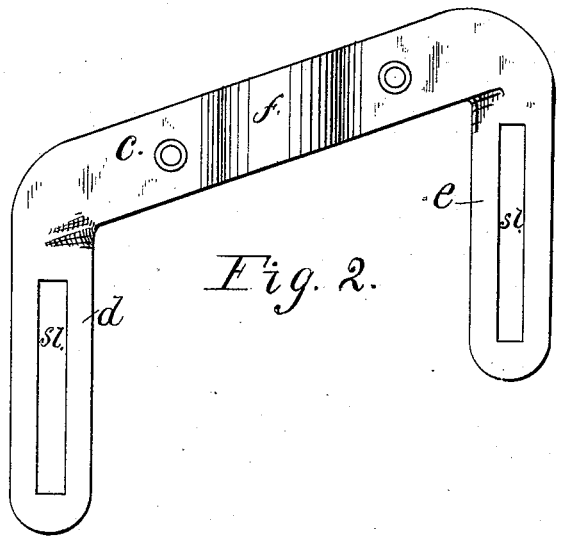
Figure 5:
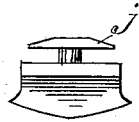
Figure 4:
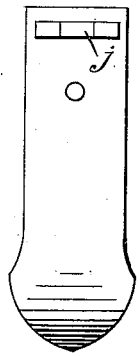
Figure 3:
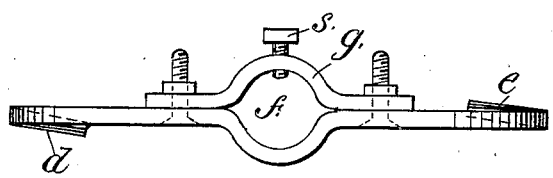
Figure 1:
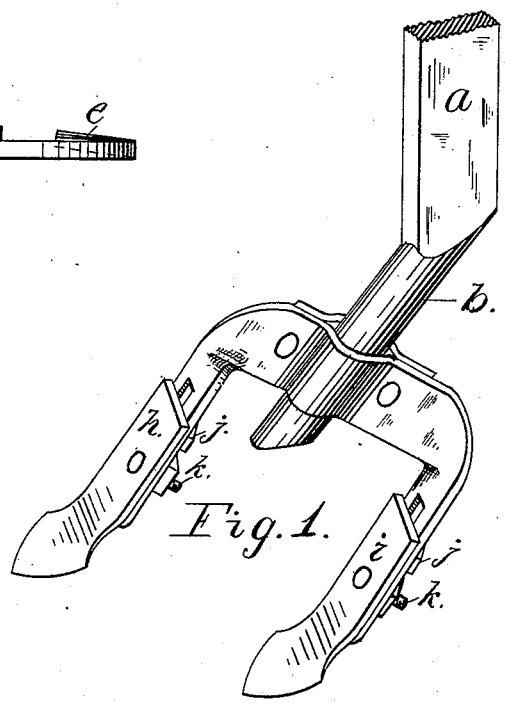

Figure 1 represents my improved attachment applied to a cultivator-plow standard. Fig. 2 is an enlarged front elevation of my attachment. Fig. 3 is a plan of the same. Fig. 4 is a rear elevation of one of the shovels. Fig. 5 is an end elevation of the same.

The plow-standard $a$ is of the usual well-known form, having a cylindrical portion, $b$, inclined forward. To this cylindrical portion a single shovel having a suitable socket is usually secured.

It is often desirable to stir the earth about and between the growing plants more thoroughly than can be done with a single shovel on each standard of the cultivator. For this purpose, instead of using another cultivator having more and differently-disposed plow-standards, as has heretofore been done, I provide a bar, $c$, turned downward at each end to form arms $d$ and $e$, and having a central socket, $f$. Said socket $f$ is adapted to embrace and to clamp the cylindrical portion $b$ of the standard. It may be formed entirely in the bar, in which case the standard is clamped by a set-screw, $s$; or it may be formed partly in the bar and partly in a cap, $g$, in which case the standard is clamped between the two parts. The surfaces of arms $d$ and $e$ are not parallel with the surface of the connecting portion of the bar, but are twisted at or near the angle where they join said connecting portion, so as to form two parallel surfaces in different planes. Each of said arms is provided with a longitudinal slot, $sl$, for the purpose of permitting the adjustment of the shovels $h$ and $i$ thereon. Each of said shovels is provided with a T-shaped lug, $j$, and a bolt, $k$. Said lug is passed through the slot by turning the shovel across the arm, the lug engaging the opposite side of the arm when the shovel is turned parallel therewith, and the shovel is held in place by the bolt $l$.

For the purpose of allowing bar $c$ to be fixed on the standard at a proper angle to hold the surfaces of the two shovels at the desired angle to the line of draft but in different planes, and at the same time have the edges of the shovels perpendicular, the socket $f$ is not made squarely across the bar, but forms an acute angle therewith, and arms $d$ and $e$ are parallel with the axis of said socket, as shown. By the use of this device a double-shovel plow may be quickly changed to a four-shovel cultivator.

In operation the bar $c$ is secured to the standard, as before described, and at such an angle with the line of draft as to cause the shovels to stand in different planes, one forward of the other, and at the necessary angle to turn the earth toward or from the plants, as may be desired. The shovels are now adjusted along their respective supporting-arms to enter the earth to the required depth, and are there secured by their bolts $l$.

I claim as my invention—

1. The combination, with a plow-standard and a pair of cultivator-shovels, of bar $c$, having central eye, $f$, placed at an acute angle, as shown and described, and slotted arms $d$ and $e$, projecting downward on lines parallel with said socket, and having their respective surfaces in different transverse parallel planes, all substantially as and for the purpose specified.

2. In a cultivator, the combination, with arm $d$, having slot $sl$ and shovel $h$, of the T-shaped lug $j$ and bolt $k$, substantially as and for the purpose specified.

JAMES HAGANS.

Witnesses:
 JOHN W. JONES,
 JOHN S. FROST,
 JOSEPH E. BRADLEY.